US010210670B2

(12) United States Patent
Yamazaki

(10) Patent No.: US 10,210,670 B2
(45) Date of Patent: Feb. 19, 2019

(54) HEAD-MOUNTED DISPLAY DEVICE, METHOD OF CONTROLLING HEAD-MOUNTED DISPLAY DEVICE, AND COMPUTER PROGRAM

(71) Applicant: SEIKO EPSON CORPORATION, Tokyo (JP)

(72) Inventor: Akio Yamazaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/518,142

(22) PCT Filed: Oct. 8, 2015

(86) PCT No.: PCT/JP2015/005116
§ 371 (c)(1),
(2) Date: Apr. 10, 2017

(87) PCT Pub. No.: WO2016/059781
PCT Pub. Date: Apr. 21, 2016

(65) Prior Publication Data
US 2017/0243406 A1 Aug. 24, 2017

(30) Foreign Application Priority Data

Oct. 15, 2014 (JP) .................................. 2014-210455
May 15, 2015 (JP) .................................. 2015-099841

(51) Int. Cl.
*G06T 19/20* (2011.01)
*G06T 19/00* (2011.01)
(Continued)

(52) U.S. Cl.
CPC .......... *G06T 19/20* (2013.01); *G02B 27/0172* (2013.01); *G06T 19/006* (2013.01);
(Continued)

(58) Field of Classification Search
CPC combination set(s) only.
See application file for complete search history.

(56) References Cited

U.S. PATENT DOCUMENTS

2012/0032874 A1* 2/2012 Mukawa .................. G02B 3/12
345/8
2012/0075484 A1* 3/2012 Kawamoto ........... G06T 19/006
348/207.1
(Continued)

FOREIGN PATENT DOCUMENTS

JP  2007-018173 A  1/2007
JP  2010-170316 A  8/2010
(Continued)

OTHER PUBLICATIONS

Dec. 18, 2015 International Search Report issued in International Patent Application No. PCT/JP2015/005116.
(Continued)

*Primary Examiner* — Wesner Sajous
(74) *Attorney, Agent, or Firm* — Oliff PLC

(57) ABSTRACT

A head-mounted display device with which a user can visually recognize a virtual image and an outside scene includes an image display unit configured to cause the user to visually recognize the virtual image, an augmented-reality processing unit configured to cause the image display unit to form the virtual image including a virtual object, at least a part of which is superimposed and displayed on a real object present in the real world, a color detecting unit configured to detect a real object color, which is a color of the real object, and a color adjusting unit configured to bring a visual observation color, which is a color obtained by superimposing a color of the virtual object on the real object color, close to a target color using the detected real object color.

9 Claims, 10 Drawing Sheets

(51) Int. Cl.
G09G 5/02 (2006.01)
G09G 5/39 (2006.01)
H04N 1/60 (2006.01)
G02B 27/01 (2006.01)
G09G 3/00 (2006.01)

(52) U.S. Cl.
CPC ....... *G09G 3/002* (2013.01); *G02B 2027/014* (2013.01); *G02B 2027/0112* (2013.01); *G02B 2027/0138* (2013.01); *G02B 2027/0178* (2013.01); *G06T 2219/2012* (2013.01)

(56) References Cited

U.S. PATENT DOCUMENTS

| | | | | |
|---|---|---|---|---|
| 2012/0113228 | A1* | 5/2012 | Konno | H04N 13/239 348/47 |
| 2012/0127284 | A1* | 5/2012 | Bar-Zeev | G02B 27/017 348/53 |
| 2013/0234914 | A1 | 9/2013 | Fujimaki | |
| 2013/0335435 | A1* | 12/2013 | Ambrus | G06T 19/20 345/589 |
| 2016/0033770 | A1* | 2/2016 | Fujimaki | G06T 19/006 345/8 |

FOREIGN PATENT DOCUMENTS

| | | |
|---|---|---|
| JP | 2013-186641 A | 9/2013 |
| JP | 2013-208227 A | 10/2013 |

OTHER PUBLICATIONS

Yamamoto Goshiro et al. "Basic Study of Apparent Control Projection Method in Consideration of Illumination Change". Nara Integrated Science and Technology Graduate School, Jun. 7, 2014.

* cited by examiner

[Fig. 1]
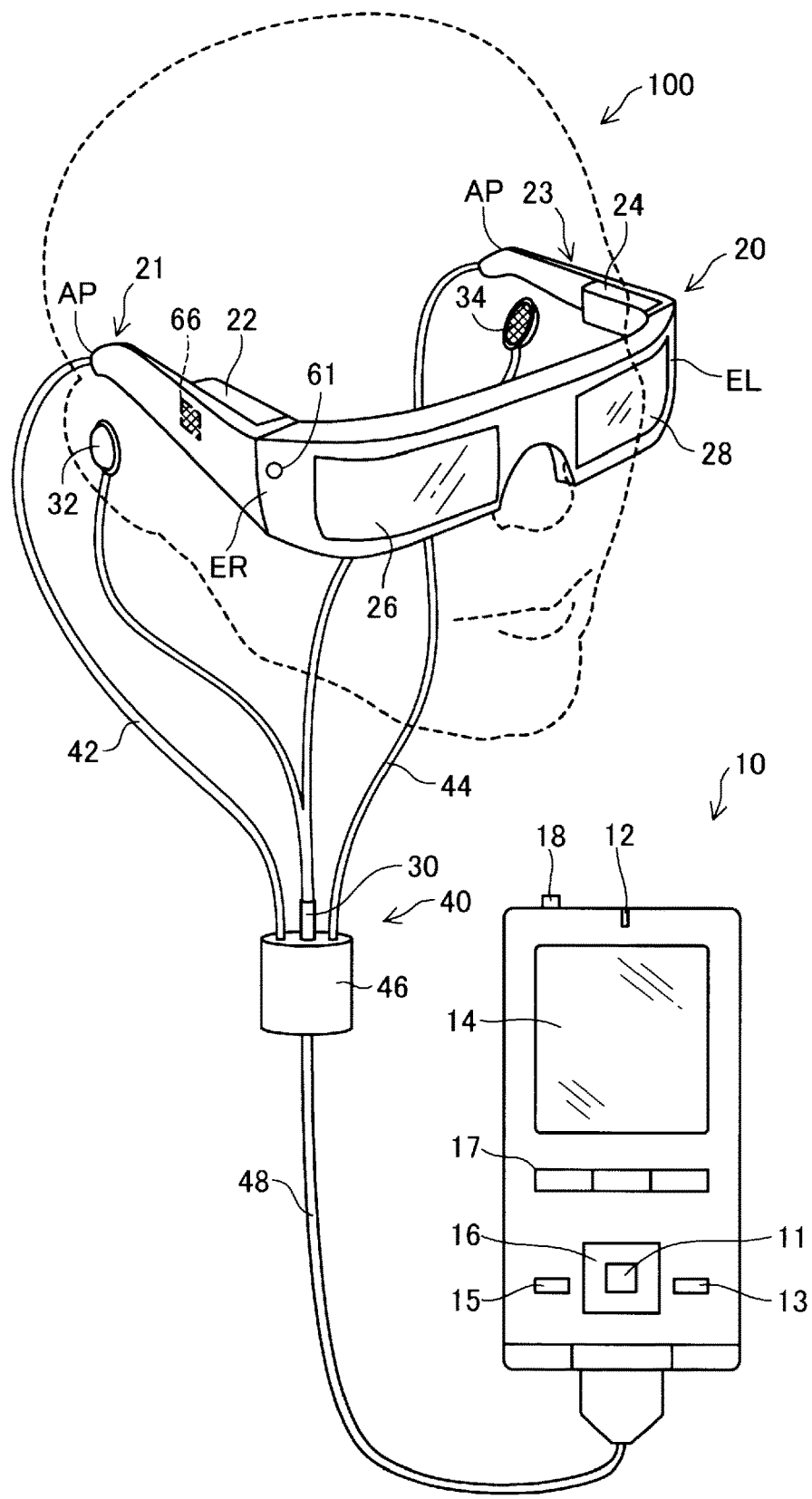

[Fig. 2]
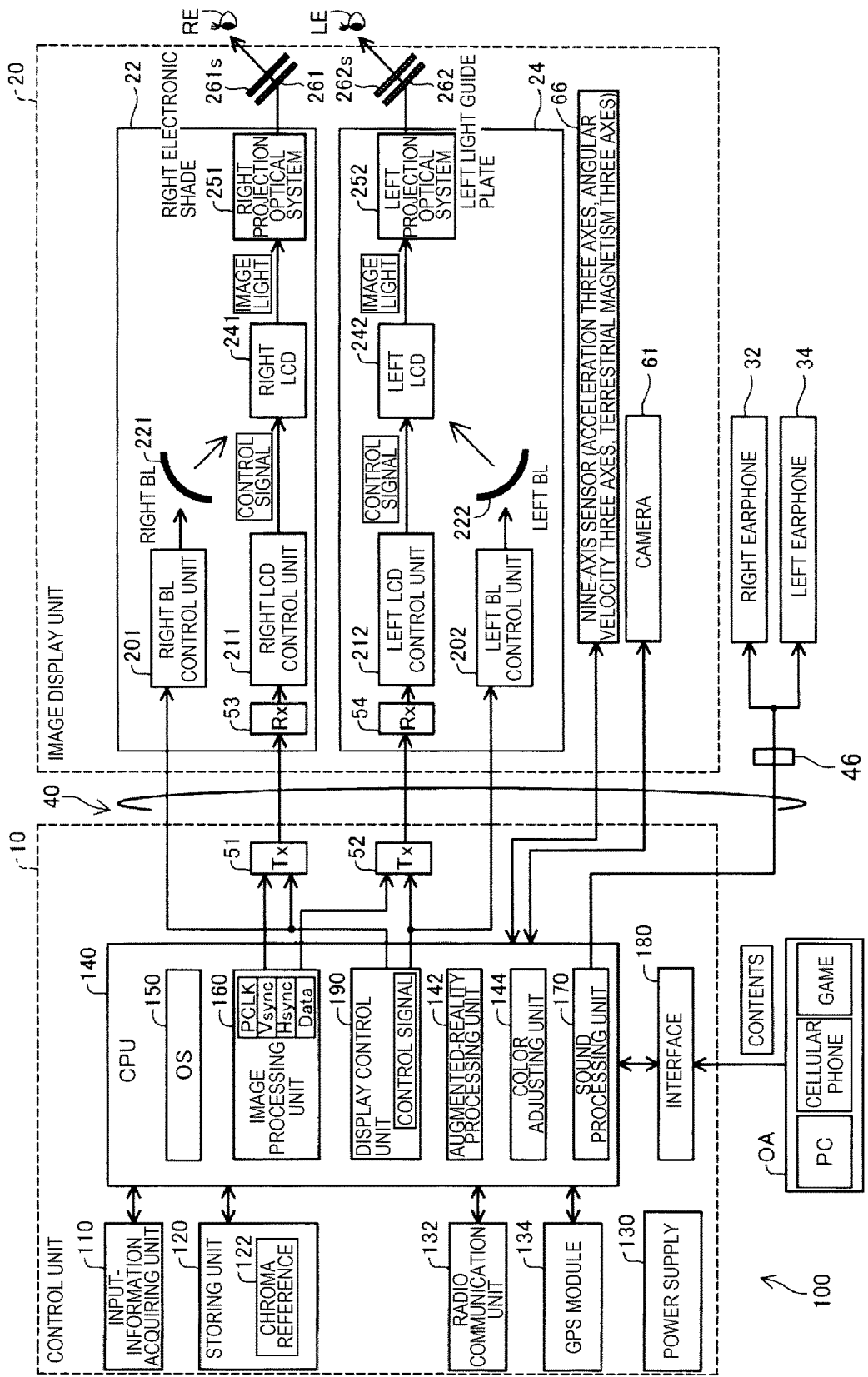

[Fig. 3A]
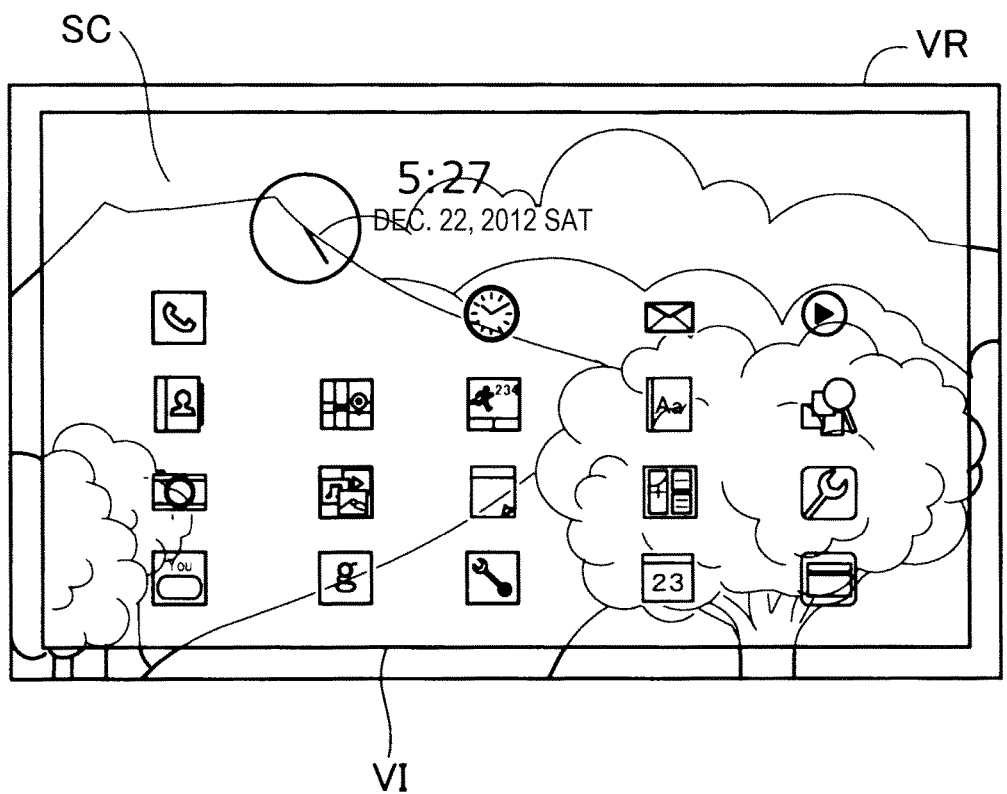
[Fig. 3B]
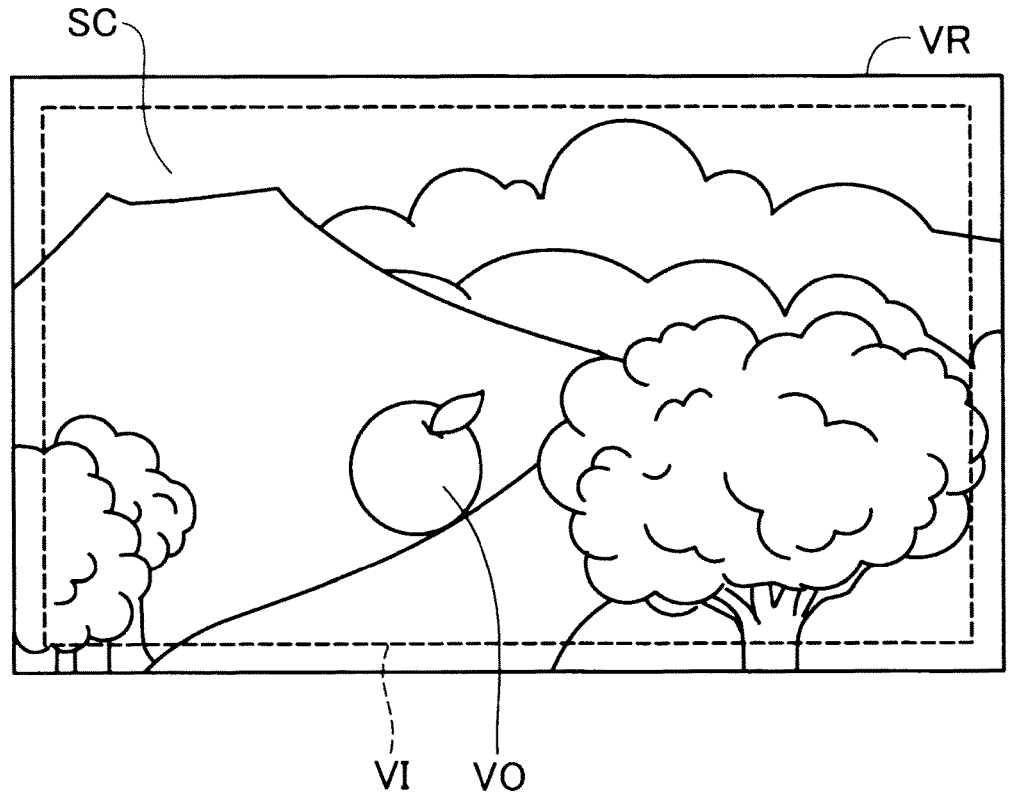

[Fig. 4]
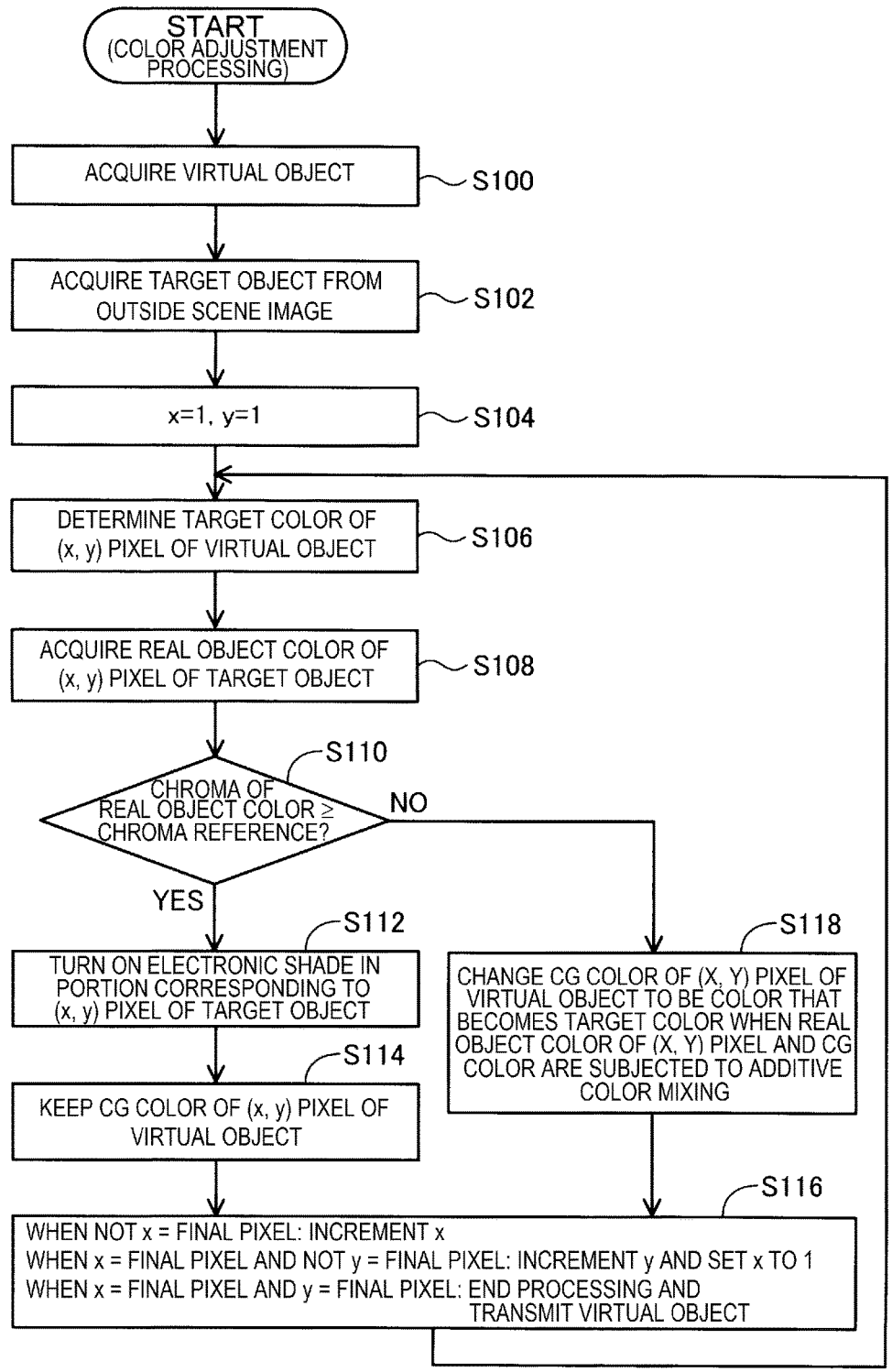

[Fig. 5]
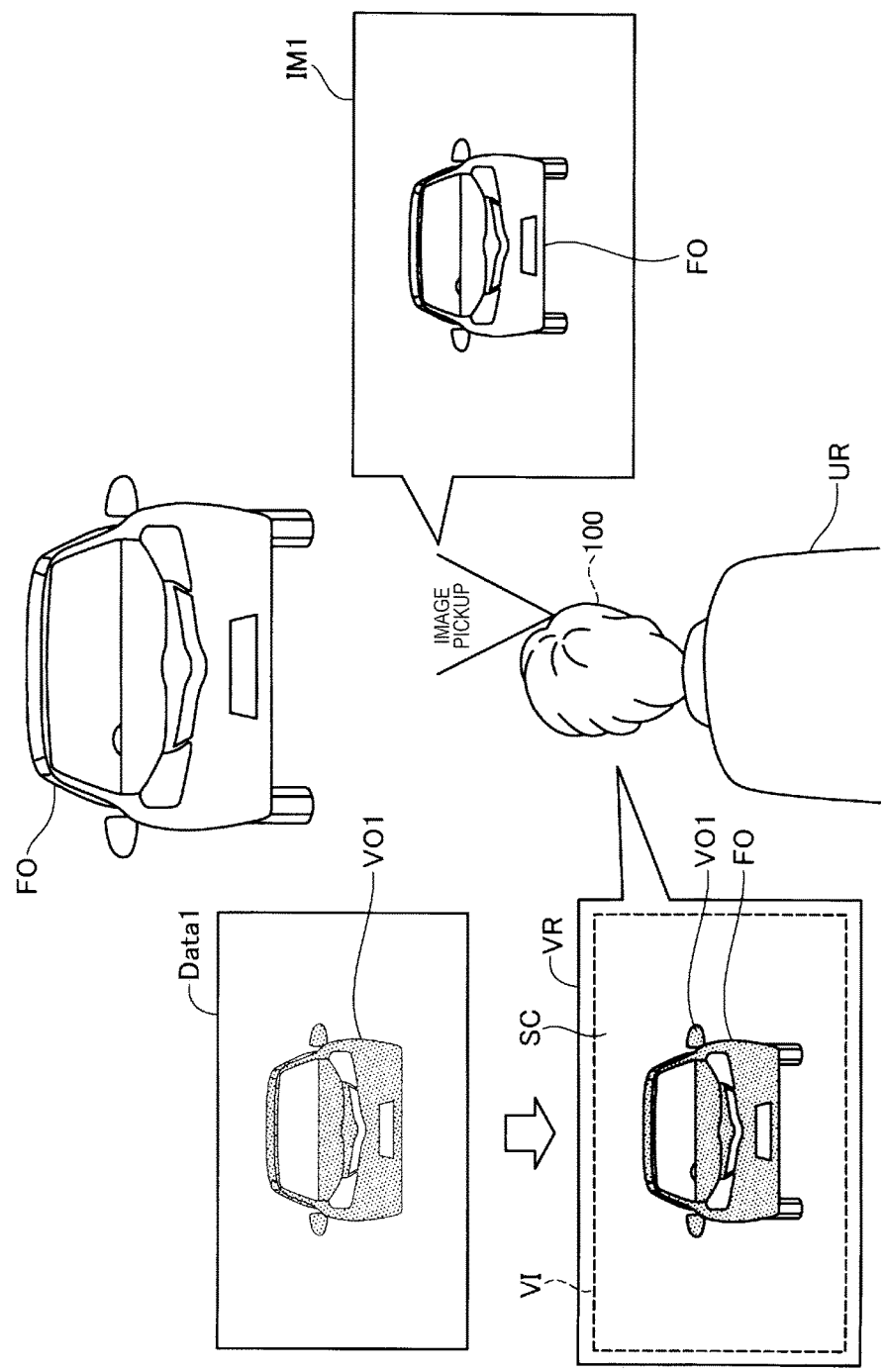

[Fig. 6]
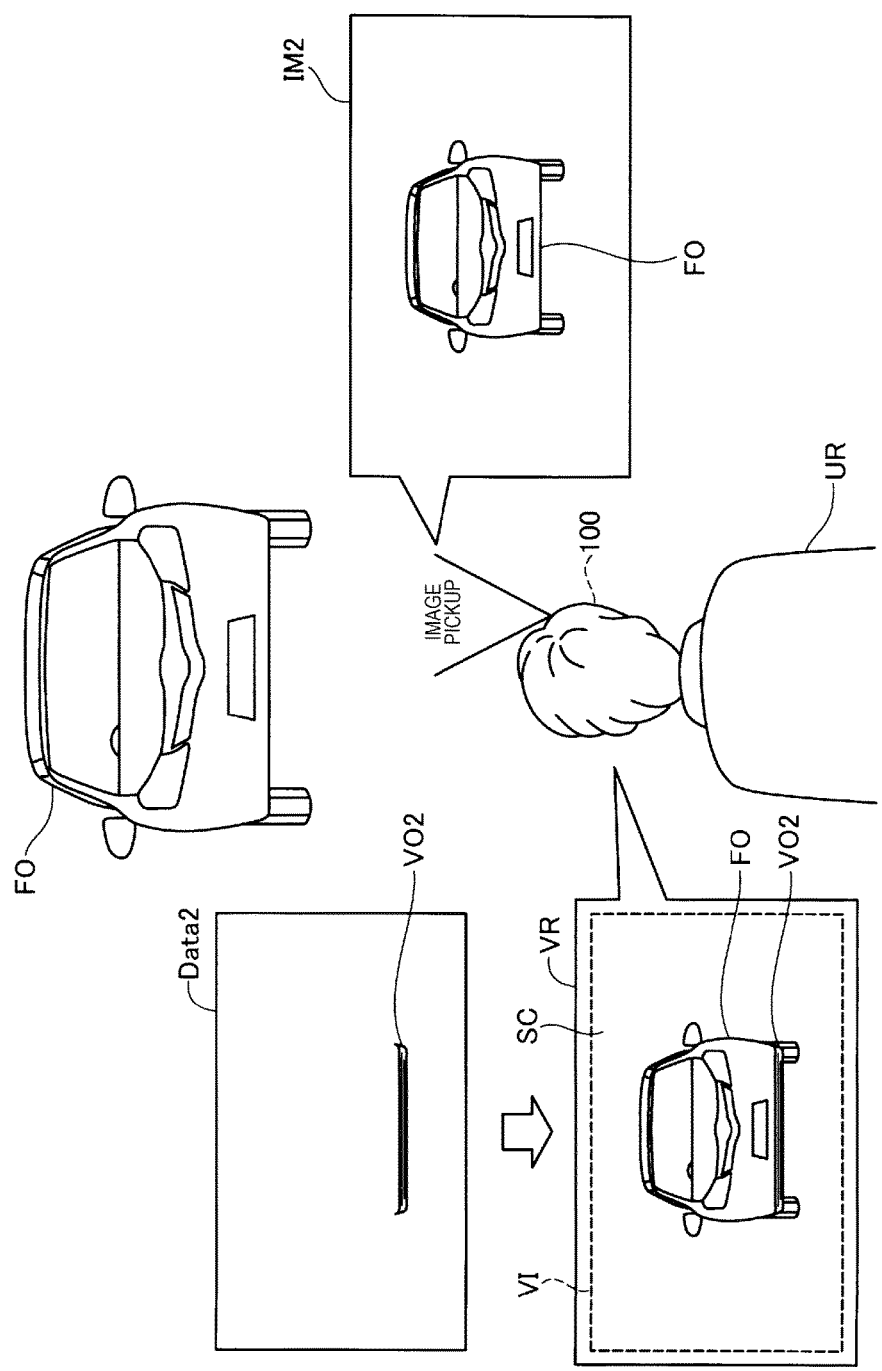

[Fig. 7]
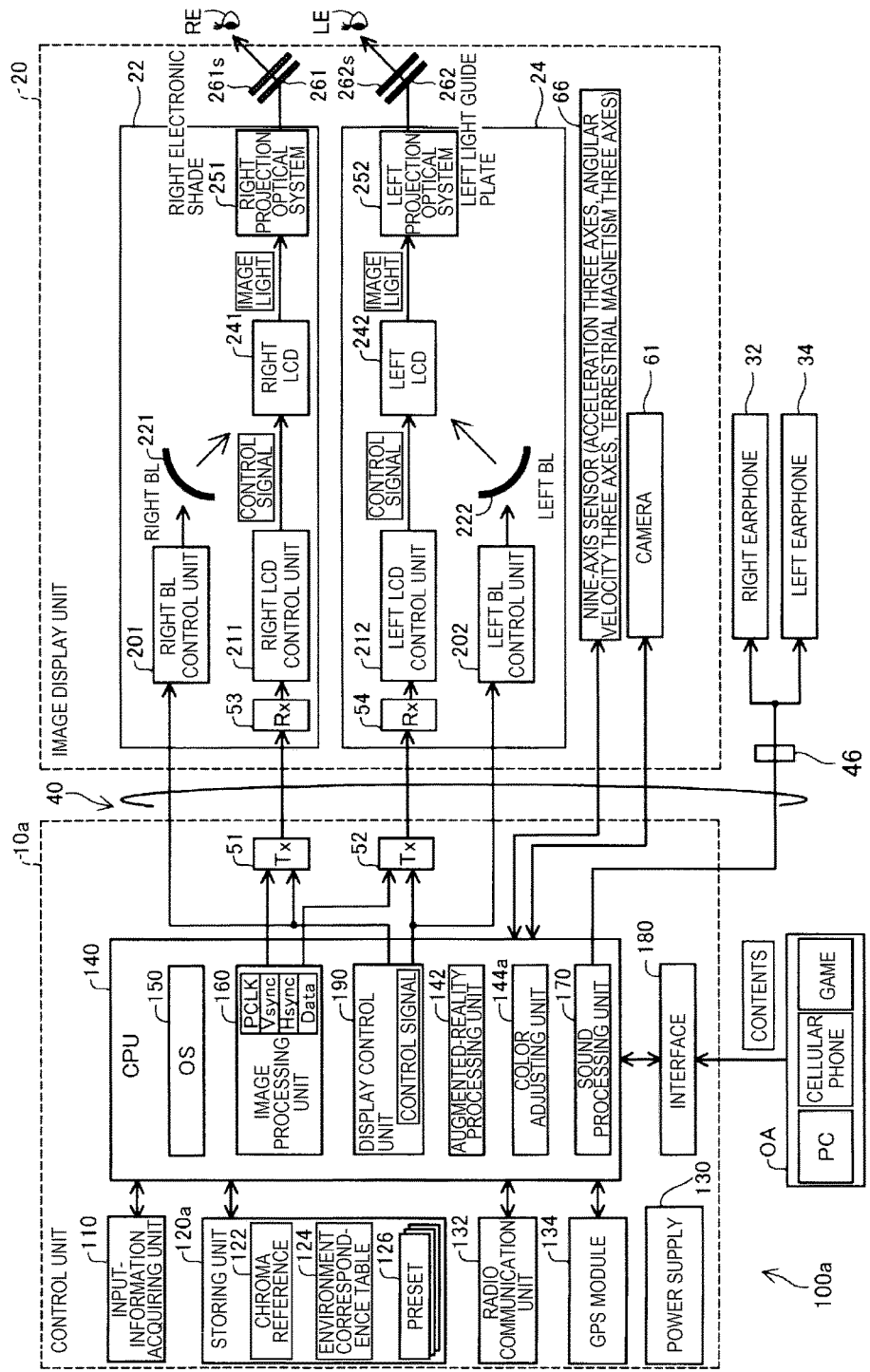

[Fig. 8]
|  |  | REAL LIGHT ENVIRONMENT | |
|---|---|---|---|
|  |  | NOT TAKE INTO ACCOUNT | TAKE INTO ACCOUNT |
| VIRTUAL LIGHT ENVIRON-MENT | NOT TAKE INTO ACCOUNT | CATALOG COLOR REFERENCE (b1) | MATCHING COLOR REFERENCE (b2) |
|  | TAKE INTO ACCOUNT | CATALOG COLOR REFERENCE (b1) + COLOR CONVERSION PROCESSING | MATCHING COLOR REFERENCE (b2) + COLOR CONVERSION PROCESSING |
[Fig. 9]
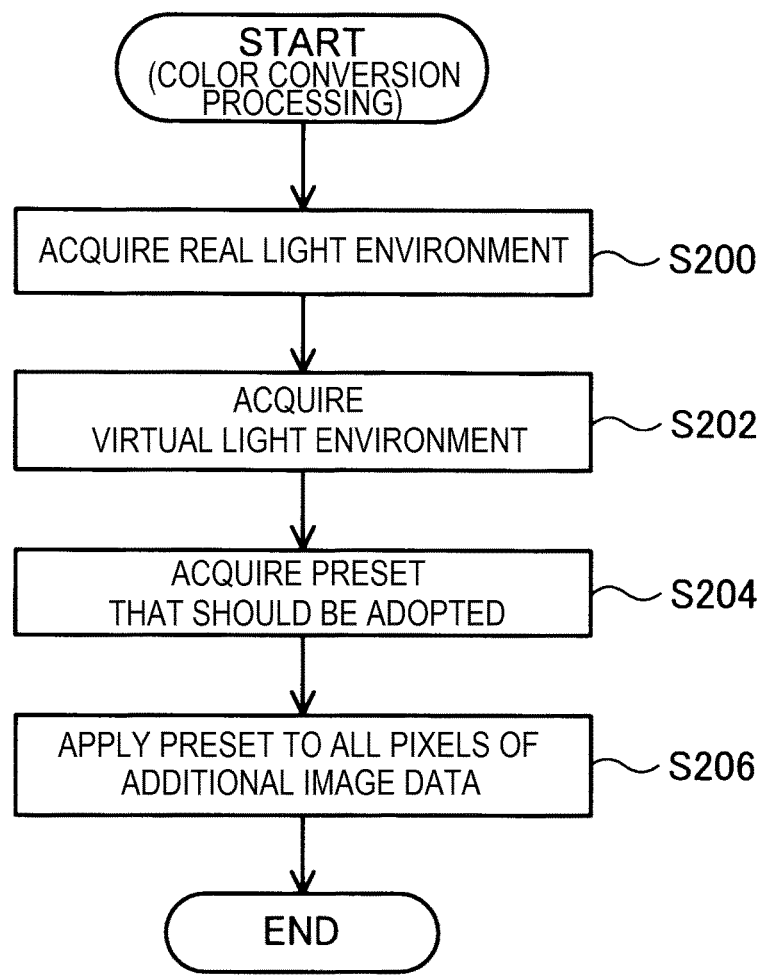

[Fig. 10]
|  |  | VIRTUAL LIGHT ENVIRONMENT | | |
|---|---|---|---|---|
|  |  | FLUORESCENT LAMP | INCANDESCENT LAMP | SUNLIGHT |
| REAL LIGHT ENVIRON-MENT | FLUORES-CENT LAMP | – | PRESET 1 | PRESET 2 |
|  | INCANDES-CENT LAMP | PRESET 3 | – | PRESET 4 |
|  | SUNLIGHT | PRESET 5 | PRESET 6 | – |
[Fig. 11A]
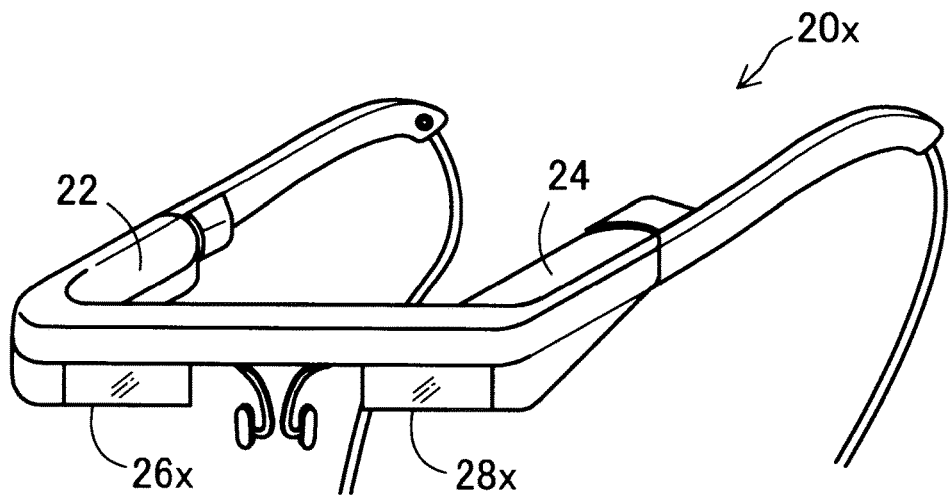

[Fig. 11B]
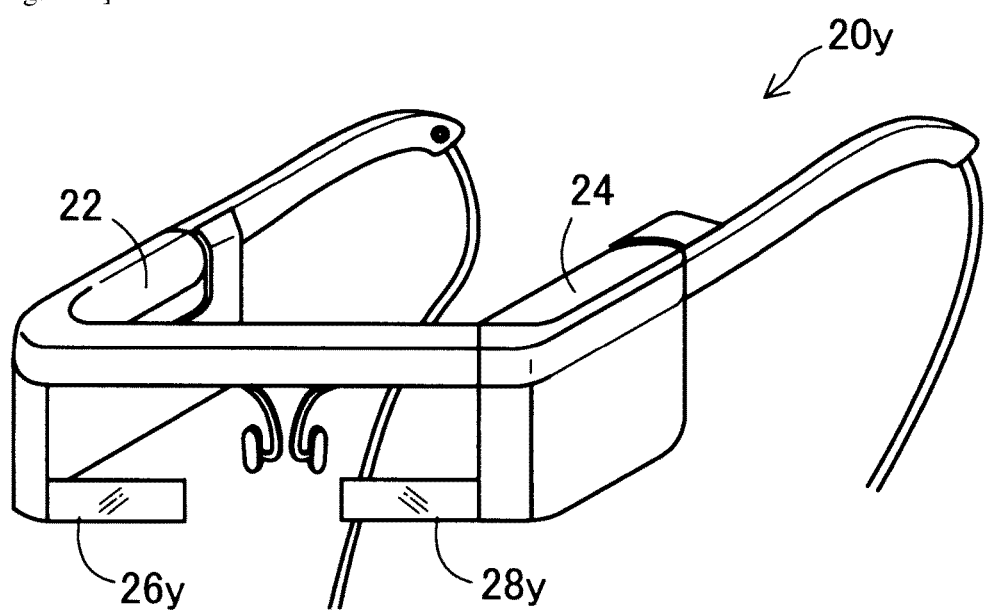

HEAD-MOUNTED DISPLAY DEVICE, METHOD OF CONTROLLING HEAD-MOUNTED DISPLAY DEVICE, AND COMPUTER PROGRAM

TECHNICAL FIELD

The present invention relates to a head-mounted display device.

BACKGROUND ART

There is known a technique called augmented reality (AR) for presenting information additionally to a real object, which is an object present in the real world, using a computer. In the augmented reality, the information displayed additionally to the real object is also called "virtual object". Functions of the augmented reality are mounted on a head mounted display (hereinafter referred to as "HMD" or "head-mounted display device").

The HMD picks up an image of an outside scene with a camera, recognizes the image obtained by the image pickup, and generates or acquires a virtual object. A transmissive HMD, which does not block the visual field of a user in a mounted state of the HMD, causes the user to visually recognize only a virtual image including a virtual object. The user can experience the augmented reality by viewing both of a real object in the real world and the virtual object represented by the virtual image. PTL 1 describes a technique for aligning a display region of the virtual image and an image pickup region of the camera in the transmissive HMD to reduce a sense of discomfort that the user feels when the augmented reality is realized.

CITATION LIST

Patent Literature

PTL 1: JP-A-2013-186641

SUMMARY OF INVENTION

Technical Problem

At least a part of the virtual object is sometimes superimposed and displayed on the real object, for example, when the augmented reality is used in determining, in a car dealer, a color and accessories of a car to be ordered or when the augmented reality is used in determining, in a housing exhibition place, wallpapers and a floor material of a house to be ordered. In such a case, a color visually recognized by the user in a state in which a color of the real object and a color of the virtual object are superimposed is important. The technique described in PTL 1 does not take into account such a problem concerning the color.

Therefore, there is a demand for a head-mounted display device capable of controlling the color visually recognized by the user in the state in which the color of the real object and the color of the virtual object are superimposed.

Solution to Problem

An advantage of some aspects of the invention is to solve at least a part of the problems described above, and the invention can be implemented as the following aspects.

(1) An aspect of the invention provides a head-mounted display device with which a user can visually recognize a virtual image and an outside scene. The head-mounted display device includes: an image display unit configured to cause the user to visually recognize the virtual image; an augmented-reality processing unit configured to cause the image display unit to form the virtual image including a virtual object, at least a part of which is superimposed and displayed on a real object present in the real world; a color detecting unit configured to detect a real object color, which is a color of the real object; and a color adjusting unit configured to bring a visual observation color, which is a color obtained by superimposing a color of the virtual object on the real object color, close to a target color using the detected real object color.

With the head-mounted display device of this aspect, the color adjusting unit can control, using the real object color detected by the color detecting unit, the visual observation color, which is the color obtained by superimposing the color of the real object (the real object color) and the color of the virtual object, in other words, the visual observation color, which is the color visually recognized by the user.

(2) In the head-mounted display device of another aspect, the color adjusting unit may bring the visual observation color close to the target color by adjusting the color of the virtual object to bring a color obtained by additive color mixing of the detected real object color and the color of the virtual object close to the target color.

With the head-mounted display device of this aspect, the color adjusting unit can bring the visual observation color close to the target color by adjusting the color of the virtual object. That is, it is possible to control the target color without adding a special component to the existing components included in the head-mounted display device.

(3) In the head-mounted display device of another aspect, the image display unit may be further capable of changing the transmittance of the outside scene for each pixel, and the color adjusting unit may bring the visual observation color close to the target color by causing the image display unit to change the transmittance of the outside scene.

With the head-mounted display device of this aspect, the color adjusting unit can bring the visual observation color close to the target color by changing the transmittance of the outside scene in the image display unit. That is, it is possible to control the visual observation color without requiring special image processing in the head-mounted display device.

(4) In the head-mounted display device of another aspect, the color adjusting unit may cause the image display unit to change the transmittance of the outside scene when the chroma of the detected real object color is equal to or higher than predetermined chroma and may adjust, when the chroma of the detected real object color is lower than the predetermined chroma, the color of the virtual object to bring the color obtained by the additive color mixing of the detected real object color and the color of the virtual object close to the target color.

With the head-mounted display device of this aspect, the color adjusting unit properly distinguishes, according to the chroma (brightness) of the real object color, whether the visual observation color is controlled by changing the transmittance of the outside scene or the visual observation color is controlled by adjusting the color of the virtual object. When the chroma of the real object color is high (the real object color is bright), it is effective to highlight the color of the virtual object by, for example, reducing the transmittance of the outside scene to make the bright real object color itself less easily seen for the user. On the other hand, when the chroma of the real object color is low (the real object color is dully), a representable color gamut can be expanded if a toned color obtained by adjusting the color of the virtual object with the additive color mixing is used. It is effective to improve the resolution of a color in this way because subtle color reproduction is possible. Consequently, the color adjusting unit can properly use, according to the chroma of the real object color, a more appropriate method for controlling the visual observation color.

(5) In the head-mounted display device of another aspect, the color adjusting unit may execute, for each pixel of the virtual object, processing for bringing the visual observation color close to the target color.

With the head-mounted display device of this aspect, the color adjusting unit executes the control of the visual observation color (the processing for bringing the visual observation color close to the target color) for each pixel of the virtual object. Therefore, it is possible to easily perform the control of the visual observation color. Even when a plurality of colors are mixed in the virtual object, it is possible to control the visual observation color.

(6) In the head-mounted display device of another aspect, the color adjusting unit may execute, for each n*m (n and m are integers equal to or larger than 2) pixel block, which is a collection of a plurality of pixels in the vicinity among pixels of the virtual object, processing for bringing the visual observation color close to the target color.

With the head-mounted display device of this aspect, the color adjusting unit executes the control of the visual observation color (the processing for bringing the visual observation color close to the target color) for each pixel block of the virtual object. Therefore, it is possible to suppress a result of the control of the visual observation color from fluctuating for each pixel. Even when a plurality of colors are mixed in the virtual object, it is possible to control the visual observation color.

(7) In the head-mounted display device of another aspect, the color adjusting unit may determine the target color on the basis of a real light environment in which the real object is placed.

With the head-mounted display device of this aspect, the color adjusting unit determines the target color on the basis of the real light environment in which the real object is placed. Therefore, the target color can be set to, for example, a color matching a real environment. The color adjusting unit can set the target color to, for example, a color conspicuous in the real environment.

(8) In the head-mounted display device of another aspect, the color adjusting unit may further change the visual observation color by converting the color of the virtual object taking into account a virtual light environment.

With the head-mounted display device of this aspect, the color adjusting unit changes the visual observation color taking into account the virtual light environment. Therefore, latitude of reproduction of the visual observation color in the head-mounted display device is increased. It is possible to improve convenience for the user.

(9) In the head-mounted display device of another aspect, the color detecting unit may be a camera that acquires an outside scene image representing the outside scene.

With the head-mounted display device of this aspect, it is possible to detect the real object color using a widely spread camera as a standard function.

Not all of a plurality of components included in the aspects of the invention explained above are essential. In order to solve a part or all of the problems explained above or in order to attain a part or all of the effects described in this specification, it is possible to appropriately perform, concerning a part of the plurality of components, a change, deletion, replacement with new components, and partial deletion of limitation contents. In order to solve a part or all of the problems explained above or in order to attain a part or all of the effects described in this specification, it is also possible to combine a part or all of the technical features included in one aspect of the invention with the technical features included in the other aspects of the invention to form an independent aspect of the invention.

For example, one aspect of the invention can be implemented as a device including a part of all of the four components, that is, the image display unit, the augmented-reality processing unit, the color detecting unit, and the color adjusting unit. That is, the device may or may not include the image display unit. The device may or may not include the augmented-reality processing unit. The device may or may not include the color detecting unit. The device may or may not include the color adjusting unit. The device can be implemented as, for example, a head-mounted display device. The device can also be implemented as a device other than the head-mounted display device. A part or all of the technical features of the head-mounted display device in the aspects can be applied to the device. For example, a device in one aspect of the invention has an object of controlling a color visually recognized by the user in a state in which the color of the real object and the color of the virtual object are superimposed. However, besides, a reduction in the size of the device, improvement of convenience, a reduction in costs of device manufacturing, resource saving, facilitation of manufacturing, and the like are desired for the device.

Note that the invention can be implemented in various forms. The invention can be implemented in forms of, for example, a head-mounted display device, a control method for the head-mounted display device, a system including the head-mounted display device, a computer program for implementing functions of the method, the device, and the system, a device for distributing the computer program, and a storage medium having the computer program stored therein.

BRIEF DESCRIPTION OF DRAWINGS

FIG. 1 is an explanatory diagram showing the schematic configuration of a head-mounted display device in an embodiment of the invention.

FIG. 2 is a block diagram showing the configuration of the head-mounted display device in terms of functions.

FIG. 3A is an explanatory diagram showing examples of virtual images visually recognized by a user.

FIG. 3B is an explanatory diagram showing examples of virtual images visually recognized by a user.

FIG. 4 is a flowchart for explaining a procedure of color adjustment processing.

FIG. 5 is a diagram for explaining an example of the color adjustment processing.

FIG. 6 is a diagram for explaining another example of the color adjustment processing.

FIG. 7 is a block diagram showing the configuration of a head-mounted display device in a second embodiment in terms of functions.

FIG. 8 is a diagram for explaining color adjustment processing in the second embodiment.

FIG. 9 is a flowchart for explaining a procedure of color conversion processing.

FIG. 10 is a diagram showing an example of an environment correspondence table.

FIG. 11A is an explanatory diagram showing the configurations of the exteriors of head-mounted display devices in modifications.

FIG. 11B is an explanatory diagram showing the configurations of the exteriors of head-mounted display devices in modifications.

DESCRIPTION OF EMBODIMENTS

A. Embodiments

A-1. Configuration of a Head-Mounted Display Device

FIG. 1 is an explanatory diagram showing the schematic configuration of a head-mounted display device in one of the embodiments of the invention. A head-mounted display device 100 in this embodiment is a display device mounted on a head and is also referred to as head mounted display (HMD). The HMD 100 is an optically transmissive head mounted display with which a user can visually recognize a virtual image and, at the same time, directly and visually recognize an outside scene.

The HMD 100 in this embodiment can perform augmented reality (AR) processing for adding information to a "real object", which is an object present in the real world, using a CPU of the HMD 100. The object means any person, any animal or plant, any object (including an artificial object and a natural object), and the like. In the augmented reality processing, the information displayed additionally to the real object is referred to as "virtual object". In the augmented reality processing, the HMD 100 in this embodiment causes the user to visually recognize only a virtual image including the virtual object. The user can experience the augmented reality by viewing both of the real object transmitted through the HMD 100 and the virtual object represented by the virtual image. In such virtual reality processing, the HMD 100 in this embodiment can control a color obtained by superimposing a color of the real object and a color of the virtual object, in other words, a color visually recognized by the user (hereinafter simply referred to as "visual observation color" as well).

Note that the real object in this embodiment includes both of a "real interested object", which is an object in which the user is interested (i.e., at which the user is looking), and a "real background object", which is an object in which the user is uninterested (e.g., at which the user is not looking, although the object is within the visual field of the user). The real object including both of the real interested object and the real background object may be a processing target of the augmented reality processing in this embodiment.

The HMD 100 includes an image display unit 20 that causes the user to visually recognize a virtual image in a state in which the HMD 100 is mounted on the head of the user and a control unit (a controller) 10 that controls the image display unit 20. Note that, in the following explanation, the virtual image visually recognized by the user using the HMD 100 is also referred to as "displayed image" for convenience. The HMD 100 emitting image light generated on the basis of image data is also referred to as "display an image".

A-1-1. Configuration of the Image Display Unit

FIG. 2 is a block diagram showing the configuration of the HMD 100 in terms of functions. The image display unit 20 is a wearing body worn on the head of the user. In this embodiment, the image display unit 20 has an eyeglass shape (FIG. 1). The image display unit 20 includes a right holding unit 21, a right display driving unit 22, a left holding unit 23, a left display driving unit 24, a right optical-image display unit 26, a left optical-image display unit 28, a camera 61, and a nine-axis sensor 66. Positional relations and functions of the units of the image display unit 20 in a state in which the user wears the image display unit 20 are explained.

As shown in FIG. 1, the right optical-image display unit 26 and the left optical-image display unit 28 are disposed to be respectively located in front of the right eye and in front of the left eye of the user. One end of the right optical-image display unit 26 and one end of the left optical-image display unit 28 are connected in a position corresponding to the middle of the forehead of the user. As shown in FIG. 2, the right optical-image display unit 26 includes a right light guide plate 261, a right electronic shade 261s, and a dimming plate (not shown in the figure). The right guide plate 261 is formed of a light-transmissive resin material or the like. The right light guide plate 261 guides image light output from the right display driving unit 22 to a right eye RE of the user while reflecting the image light along a predetermined optical path.

The right electronic shade 261s is a transmissive liquid crystal panel on which a plurality of pixels are arranged in a matrix shape. The right electronic shade 261s increases and reduces, according to an increase and a decrease in a supply voltage, in pixel units, the transmittance of external light guided from the outside to the right eye RE of the user. In the right electronic shade 261s in this embodiment, the transmittance of the external light is 100% in a state without the supply voltage. The transmittance of the external light is 0% (the external light is blocked) in a state in which the supply voltage is the largest. Note that the disposition of the electronic shade in FIG. 2 is an example. The right electronic shade 261s only has to be disposed on an optical path between the right LCD 241 and the right eye RE of the user. The right electronic shade 261s may be disposed outside the optical path between the right LCD 241 and the right eye RE of the user so that the external light that is combined into the light from the right LCD 241 directed to the right eye RE is increased or decreased by the right electronic shade 261s.

The dimming plate is a thin plate-like optical device and is disposed to cover the front side (a side opposite to the side of the eyes of the user) of the image display unit 20. The dimming plate protects the right light guide plate 261 and the right electronic shade 261s and suppresses, for example, damage and adhesion of stain to the right light guide plate 261 and the right electronic shade 261s. By adjusting the light transmittance of the dimming plate, it is possible to adjust an amount of external light entering the eyes of the user and adjust easiness of visual recognition of a virtual image. Note that the dimming plate can be omitted.

The left optical-image display unit 28 includes a left light guide plate 262, a left electronic shade 262s, and a dimming plate (not shown in the figure). Details of the left light guide plate 262, the left electronic shade 262s, and the dimming plate are the same as the right light guide plate 261, the right electronic shade 261s, and the dimming plate of the right optical-image display unit 26. Note that the right optical-image display unit 26 and the left optical-image display unit 28 are collectively simply referred to as "optical-image display units" as well. The right electronic shade 261s and the left electronic shade 262s are collectively simply referred to as "electronic shades" as well. The optical-image display units can adopt any system as long as the optical-image display units form a virtual image in front of the eyes of the user. For example, the optical-image display units may be implemented using a diffraction grating or may be implemented using a transreflective film.

As shown in FIG. 1, the right holding unit 21 is provided to extend from the other end ER of the right optical-image display unit 26 to a position corresponding to the temporal region of the user. The left holding unit 23 is provided to extend from the other end EL of the left optical-image display unit 28 to a position corresponding to the temporal region of the user. The right holding unit 21 and the left holding unit 23 hold the image display unit 20 on the head of the user like temples of eyeglasses. Note that the right holding unit 21 and the left holding unit 23 are collectively simply referred to as "holding units" as well.

As shown in FIG. 1, the right display driving unit 22 is disposed on the inner side (a side opposed to the head of the user) of the right holding unit 21. The left display driving unit 24 is disposed on the inner side of the left holding unit 23. As shown in FIG. 2, the right display driving unit 22 includes a receiving unit (Rx) 53, a right backlight (BL) control unit 201 and a right backlight (BL) 221 functioning as a light source, a right LCD (Liquid Crystal Display) control unit 211 and a right LCD 241 functioning as a display device, and a right projection optical system 251. Note that the right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is a light emitting body such as an LED (Light Emitting Diode) or an electroluminescence (EL) device. The right LCD control unit 211 drives the right LCD 241 on the basis of a clock signal PCLK, a vertical synchronization signal VSync, a horizontal synchronization signal HSync, image data Data for the right eye input via the receiving unit 53. The right LCD 241 is a transmission liquid crystal panel on which a plurality of pixels are arranged in a matrix shape. The right projection optical system 251 is a collimate lens that changes image light emitted from the right LCD 241 to light beams in a parallel state.

The left display driving unit 24 includes a receiving unit (Rx) 54, a left backlight (BL) control unit 202 and a left backlight (BL) 222 functioning as a light source, a left LCD control unit 212 and a left LCD 242 functioning as a display device, and a left projection optical system 252. Details of these components are the same as the corresponding components of the right display driving unit 22. Note that the right display driving unit 22 and the left display driving unit 24 are correctively simply referred to as "display driving units" as well.

As shown in FIG. 1, the camera 61 is disposed in a position corresponding to an upper part of the outer corner of the right eye of the user. The camera 61 picks up images in the front direction of the image display unit 20, in other words, images of an outside scene (a scene on the outside) in the visual field direction of the user in a state in which the HMD 100 is mounted and acquires an outside scene image. The camera 61 is a so-called visible light camera. Therefore, the outside scene image is an image representing the shape of an object with visible light radiated from the object. The camera 61 in this embodiment is a monocular camera. However, a so-called stereo camera may be adopted. The camera 61 functions as a "color detecting unit".

As shown in FIG. 1, the nine-axis sensor 66 is disposed in a position corresponding to the temple on the right side of the user. The nine-axis sensor 66 is a motion sensor that detects acceleration (three axes), angular velocity (three axes), and terrestrial magnetism (three axes). Since the nine-axis sensor 66 is provided in the image display unit 20, when the image display unit 20 is worn on the head of the user, the nine-axis sensor 66 functions as a motion detecting unit that detects the motion of the head of the user of the head mounted display 100. The motion of the head includes the speed, the acceleration, the angular velocity, the direction, and a change in the direction of the head.

As shown in FIG. 1, the image display unit 20 includes a connecting unit 40 for connecting the image display unit 20 to the control unit 10. The connecting unit 40 includes a main body cord 48 connected to the control unit 10, a right cord 42 and a left cord 44 branching from the main body cord 48, and a coupling member 46 provided at a branching point. A jack for connecting an earphone plug 30 is provided in the coupling member 46. A right earphone 32 and a left earphone 34 extend from the earphone plug 30. The image display unit 20 and the control unit 10 perform transmission of various signals via the connecting unit 40. As the cords of the connecting unit 40, for example, a metal cable and an optical fiber can be adopted.

A-1-2. Configuration of the Control Unit

The control unit 10 is a device for controlling the HMD 100. As shown in FIG. 1, the control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of the operation in the control unit 10. The lighting unit 12 is implemented by, for example, an LED and notifies, with a light emission state thereof, an operation state (e.g., ON/OFF of a light source) of the HMD 100. The display switching key 13 detects pressing operation and outputs, for example, a signal for switching a display mode of a content moving image to 3D and 2D.

The track pad 14 detects operation by a finger of the user on an operation surface of the track pad 14 and outputs a signal corresponding to detected content. As the track pad 14, various types such as an electrostatic type, a pressure type, and an optical type can be adopted. The luminance switching key 15 detects pressing operation and outputs a signal for increasing or reducing the luminance of the image display unit 20. The direction key 16 detects pressing operation on keys corresponding to the up, down, left, and right directions and outputs a signal corresponding to detected contents. The power switch 18 detects slide operation of the switch to switch a power supply state of the HMD 100.

As shown in FIG. 2, the control unit 10 includes an input-information acquiring unit 110, a storing unit 120, a power supply 130, a radio communication unit 132, a GPS module 134, a CPU 140, an interface 180, and transmitting units (Tx) 51 and 52. The units are connected to one another by a not-shown bus.

The input-information acquiring unit 110 acquires signals corresponding to operation inputs to the determination key 11, the display switching key 13, the track pad 14, the luminance switching key 15, the direction key 16, the menu key 17, and the power switch 18. The input-information acquiring unit 110 can acquire operation inputs by various methods other than the operation inputs explained above. For example, the input-information acquiring unit 110 may acquire an operation input by a foot switch (a switch operated by the foot of the user). For example, the input-information acquiring unit 110 may acquire a visual line of the user detected by a visual-line detecting unit (not shown in the figure) and an operation input by a command associated with the movement of the eyes. The command may be set to be capable of being added by the user. For example, a gesture of the user may be detected using the camera 61. An operation input by a command associated with the gesture may be acquired. In the gesture detection, a fingertip of the user, a ring worn on the hand of the user, a medical instrument held by the user, or the like can be used as a mark for motion detection. If the operation input by these methods can be acquired, even in work in which it is difficult for the user to release the hands, the input-information acquiring unit 110 can acquire the operation input from the user.

The storing unit 120 is configured by a ROM, a RAM, a DRAM, a hard disk, or the like. Various computer programs such as an operating system (OS) are stored in the storing unit 120. In the storing unit 120, a chroma reference 122 is stored.

In the chroma reference 122, a value serving as a reference of chroma used in color adjustment processing explained below is stored in advance. In this embodiment, as the reference of the chroma, an "S value" in an RGB color space or an HSB color space is used. A value of the chroma reference 122 is used to properly use a method of controlling a visual observation color. Note that the value of the chroma reference 122 may be capable of being changed by the user as appropriate.

The power supply 130 supplies electric power to the units of the HMD 100. As the power supply 130, for example, a secondary cell can be used.

The radio communication unit 132 performs radio communication with an external apparatus according to a predetermined radio communication standard. The predetermined radio communication standard is, for example, short distance radio communication exemplified by an infrared ray and a Bluetooth (registered trademark) or a wireless LAN exemplified by IEEE802.11.

The GPS module 134 receives a signal from a GPS satellite to thereby detect the present position of the user of the HMD 100 and generates present position information representing present position information of the user. The present position information can be implemented by, for example, coordinates representing latitude and longitude.

The CPU 140 reads out and executes a computer program stored in the storing unit 120 to thereby function as an augmented-reality processing unit 142, a color adjusting unit 144, an OS 150, an image processing unit 160, a sound processing unit 170, and a display control unit 190.

The augmented-reality processing unit 142 executes augmented reality processing. The augmented reality processing is processing for adding a virtual object to a real object actually present in a real world and displaying the virtual object. The augmented reality processing includes procedures a1 to a6 explained below.

(a1) The augmented-reality processing unit 142 acquires an outside scene image picked up by the camera 61.

(a2) The augmented-reality processing unit 142 specifies a real object set as a target of addition of a virtual object (hereinafter referred to as "target object" as well) out of real objects included in the outside scene image acquired in the procedure a1.

(a3) The augmented-reality processing unit 142 acquires the position of the target object with respect to the HMD 100 and the distance between the target object and the HMD 100. In acquiring the position and the distance, the augmented-reality processing unit 142 may calculate the position and the distance using two or more outside scene images acquired by a stereo camera. The augmented-reality processing unit 142 may calculate the position and the distance using not-shown various sensors (e.g., a depth sensor and a rang-finding sensor).

(a4) The augmented-reality processing unit 142 acquires or generates an image, characters, a graphic symbol, or the like representing the virtual object. The augmented-reality processing unit 142 may store the virtual object in the storing unit 120 in advance or may acquire the virtual object from another device connected to the HMD 100 via a network.

(a5) The augmented-reality processing unit 142 generates additional image data in which the virtual object in the procedure a4 is arranged according to the position and the distance of the target object acquired in the procedure a3 and a black color is arranged in other units. In this alignment, the augmented-reality processing unit 142 may use a characteristic or feature part (an edge, etc.) of the target object or may use a mark such as a marker attached to the target object. When arranging the virtual object, the augmented-reality processing unit 142 may apply image processing such as enlargement, reduction, rotation, or color conversion to the virtual object.

(a6) The augmented-reality processing unit 142 transmits additional image data to the image processing unit 160. The image processing unit 160 executes display processing explained below on the received additional image data.

The color adjusting unit 144 executes color adjustment processing for controlling a visual observation color. The color adjustment processing is processing executed between the procedure a5 and the procedure a6 as a subroutine of the augmented reality processing. Details of the color adjustment processing are explained below.

The image processing unit 160 performs signal processing for image display. Specifically, when contents (a video) are input via the interface 180 or the radio communication unit 132, the image processing unit 160 generates the imaged data Data based on the contents. When receiving image data from another functional unit of the HMD 100, the image processing unit 160 sets the received image data as the image data Data. Note that the image processing unit 160 may execute, on the image data Data, image processing such as resolution conversion processing, various kinds of tone correction processing such as adjustment of luminance and chroma, and keystone correction processing. The image processing unit 160 transmits the image data Data, the clock signal PCLK, the vertical synchronization signal VSync, and the horizontal synchronization signal HSync to the image display unit 20 via the transmitting units 51 and 52.

The display control unit 190 generates control signals for controlling the right display driving unit 22 and the left display driving unit 24. Specifically, the display control unit 190 individually controls, using the control signals, ON/OFF of driving of the right and left LCDs 241 and 242 by the right and left LCD control units 211 and 212 and ON/OFF of driving of the right and left backlights 221 and 222 by the right and left backlight control units 201 and 202 to thereby control generation and emission of image lights by the right display driving unit 22 and the left display driving unit 24. The display control unit 190 transmits the control signals to the image display unit 20 via the transmitting units 51 and 52.

The sound processing unit 170 acquires a sound signal included in the contents, amplifies the acquired sound signal, and supplies the amplified sound signal to a not-shown speaker of the right earphone 32 and a not-shown speaker of the left earphone 34.

The interface 180 performs communication with an external apparatus OA according to a predetermined wired communication standard. The predetermined wired communication standard is, for example, Micro USB (Universal Serial Bus), USB, HDMI (High Definition Multimedia Interface; HDMI is a registered trademark), DVI (Digital Visual Interface), VGA (Video Graphics Array), composite, RS-232C (Recommended Standard 232), or wired LAN exemplified by IEEE802.3. As the external apparatus OA, for example, a personal computer PC, a cellular phone terminal, and a game terminal can be used.

FIGS. 3A and 3B are explanatory diagrams showing examples of virtual images visually recognized by the user. FIG. 3A illustrates a visual field VR of the user obtained when the augmented reality processing is not executed. As explained above, the image lights guided to both the eyes of the user of the HMD 100 are focused on the retinas of the user, whereby the user visually recognizes a virtual image VI. In the example shown in FIG. 3A, the virtual image VI is a standby screen of the OS 150 of the HMD 100. The user visually recognizes an outside scene SC through the right optical-image display unit 26 and the left optical-image display unit 28. In this way, in a unit where the virtual image VI is displayed in the visual field VR, the user of the HMD 100 in this embodiment can view the virtual image VI and the outside scene SC behind the virtual image VI. In a unit where the virtual image VI is not displayed in the visual field VR, the user can directly view the outside scene SC through the optical-image display units.

FIG. 3B illustrates the visual field VR of the user obtained when the augmented reality processing is executed. By executing the augmented reality processing, the user visually recognizes the virtual image VI including a virtual object VO. The virtual object VO is an image of an apple arranged to overlap the foot of a mountain in the outside scene SC. In this way, the user can experience the augmented reality by viewing both of the virtual object VO included in the virtual image VI and a real object in the outside scene SC seen through behind the virtual image VI.

A-2. Color Adjustment Processing

The color adjustment processing is processing for controlling a visual observation color during the augmented reality processing. The visual observation color means a color obtained by superimposing a color of a real object and a color of a virtual object, in other words, a color that the user actually visually recognizes. The color adjustment processing is executed between the procedure a5 and the procedure a6 of the augmented reality processing as a subroutine of the augmented reality processing. Note that, to specify a "color" in the color adjustment processing explained below, an "RGB value" or an "HSB value" in an RGB color space or an HSB color space is used. That is, the "color" in this embodiment includes all of hue, chroma, and brightness.

FIG. 4 is a flowchart for explaining a procedure of the color adjustment processing. FIG. 5 is a diagram for explaining an example of the color adjusting processing. In the example shown in FIG. 5, in a car dealer, a user UR uses the augmented reality processing when determining a color of a vehicle body of a car to be ordered. FIG. 6 is a diagram for explaining another example of the color adjustment processing. In the example shown in FIG. 6, in the car dealer, the user UR uses the augmented reality processing when determining accessories added to the car to be ordered.

In step S100 of the color adjustment processing (FIG. 4), the color adjusting unit 144 acquires a virtual object. Specifically, the color adjusting unit 144 acquires additional image data including the virtual object from the augmented-reality processing unit 142. The additional image data is data generated in the procedure a5 of the augmented reality processing. The color adjusting unit 144 extracts the virtual object from the acquired additional image data using a method such as feature part extraction (edge extraction).

In the example shown in FIG. 5, the color adjusting unit 144 acquires additional image data Data1 from the augmented-reality processing unit 142 and extracts a virtual object VO1 representing the vehicle body. In the example shown in FIG. 6, the color adjusting unit 144 acquires additional image data Data2 from the augmented-reality processing unit 142 and extracts a virtual object VO2 representing a front spoiler.

In step S102 in FIG. 4, the color adjusting unit 144 acquires a target object from an outside scene image. The target object is a real object to which the virtual object is added. Specifically, the color adjusting unit 144 causes the camera 61 to pick up an outside scene image and acquires the outside scene image from the camera 61. The color adjusting unit 144 extracts the target object from the acquired outside scene image using a method such as feature part extraction (edge extraction).

In the example shown in FIG. 5, the color adjusting unit 144 acquires an outside scene image IM1 from the camera 61 and extracts a target object (a real object) FO representing the car. Similarly, in the example shown in FIG. 6, the color adjusting unit 144 acquires an outside scene image IM2 from the camera 61 and extracts the target object FO representing the car.

In step S104 in FIG. 4, the color adjusting unit 144 sets 1 in variables x and y used in the color adjustment processing. Both of the variables x and y are used to specify one pixel.

In step S106, the color adjusting unit 144 determines a target color of a (x, y) pixel of the virtual object. The target color is determined according to a scene in which the augmented reality processing is used and pursuant to one of references b1 and b2 explained below.

(b1) Catalog Color

The target color is decided without taking into account a real environment (in particular, a light environment) in which the target object is placed. The color adjusting unit 144 may directly set, as the target color, a color of a (x, y) pixel of the virtual object extracted in step S100 or may directly set, as the target color, a color designated by the user. Note that the color of the (x, y) pixel of the virtual object is any one of an original color of the virtual object, a color for representing texture of the virtual object, a color for representing light irradiated on the virtual object, and a color for representing shading that occurs in the virtual object. Therefore, for example, even if the virtual object is a "red car", the color of the (x, y) pixel of the virtual object is various colors such as red, white, and brown according to values of x and y (according to the position of the pixel). The reference b1 is desirably adopted when the user desires to replace at least a part of the target object with the virtual object. The user desires to replace at least a part of the target, for example, in a simulation of a vehicle body color in the dealer shown in FIG. 5 or in a simulation of wallpapers and a floor material in a housing exhibition place.

(b2) Matching Color

The target color is decided taking into account the real environment (in particular, the light environment) in which the target object is placed (e.g., the target color may be matched to the real environment or may be made conspicuous in the real environment). Specifically, the color adjusting unit 144 can decide the target color according to a method b2-1 or b2-2 illustrated below. The reference b2 is desirably adopted when the user desires to add the virtual object to the target object. The user desires to add the virtual object in, for example, a simulation of accessories in the dealer shown in FIG. 6 or a simulation of furniture in the housing exhibition place.

(b2-1) The color adjusting unit 144 calculates a statistical color (e.g., an average color or a median color) of the color of the target object (the real object) acquired in step S102. The color adjusting unit 144 sets the calculated statistical color as the target color.

(b2-2) The color adjusting unit 144 subjects the outside scene image acquired in step S102 to image recognition to thereby collect luminance information of regions (information concerning a shadow region, information concerning mirror surface reflection, information concerning diffused reflection, etc.) of the target object (the real object). The color adjusting unit 144 determines, on the basis of the collected luminance information, at least one of a type of a light source (a point light source, a spotlight, a parallel light source, environment light, skylight, IBL, etc.) to be added to the virtual object, a color temperature of the light source, the intensity of the light source, and the like. The color adjusting unit 144 combines the light source having the determined type, color temperature, intensity, or the like with the virtual object acquired in step S100. The color adjusting unit 144 sets, as the target color, a color of the (x, y) pixel of the virtual object after the combination of the light source.

Note that, in step S106, the color designated by the user as the original color of the virtual object may be stored in a storage device of another device via a network. The color stored in the other device can be used for various uses. For example, the color stored in the other device may be used for an order and manufacturing of a product (e.g., a car or wallpapers and a floor material) having a color designated by the user or may be used for an analysis for grasping tastes of the user.

In step S108 in FIG. 4, the color adjusting unit 144 acquires a real object color of the (x, y) pixel of the target object. The real object color is an actual color of the target object (the real object to which the virtual object is added). Specifically, the color adjusting section 144 acquires, as the real object color, the color of the (x, y) pixel of the target object acquired in step S102. In this way, in this embodiment, the color of the target object in the outside scene image picked up by the camera 61 is regarded as the real object color. Therefore, it is possible to detect the real object color using the camera 61 widely spread as the standard function.

In step S110, the color adjusting unit 144 determines whether the chroma (the S value) of the real object color of the (x, y) pixel of the target object acquired in step S108 is equal to or higher than the reference (the S value) stored in the chroma reference 122. When the chroma of the real object color is equal to or higher than the chroma reference 122 (YES in step S110), in processing in step S112 and subsequent steps, the color adjusting unit 144 changes the transmittance of the outside scene using the electronic shades to control the visual observation color. On the other hand, when the chroma of the real object color is lower than the chroma reference 122 (NO in step S110), in processing in step S118, the color adjusting unit 144 adjusts the color of the virtual object to control the visual observation color.

Controlling the visual observation color by changing the transmittance of the outside scene using the electronic shades is explained. In step S112 in FIG. 4, the color adjusting unit 144 turns on the electronic shade in a unit corresponding to the (x, y) pixel of the target object. Specifically, the color adjusting unit 144 supplies a voltage to a pixel of the light electronic shade 261s shown in FIG. 2 corresponding to the (x, y) pixel of the target object and a pixel of the left electronic shade 262s shown in FIG. 2 corresponding to the (x, y) pixel of the target object to reduce the transmittance of external light in the pixel unit. In this case, the color adjusting unit 144 may set the supply voltage to the electronic shades to the maximum (100%) and block the external light. Consequently, the control in the color adjusting unit 144 is simplified. The color adjusting unit 144 may adjust the supply voltage to the electronic shades in a range of 1% to 100% in proportion to the chroma of the (x, y) pixel of the target object to block at least a part of the external light. Consequently, the color adjusting unit 144 can finely control the visual observation color.

In step S114, the color adjusting unit 144 does not change and keeps a CG color of the (x, y) pixel of the virtual object. The CG color is the color of the virtual object included in the image data.

Controlling the visual observation color by adjusting the color of the virtual object is explained. In step S118 in FIG. 4, the color adjusting unit 144 calculates a color that is (or close to) a target color iii obtained when a real object color i and a CG color ii are subjected to additive color mixing. The color adjusting unit 144 changes the CG color of the (x, y) pixel of the virtual object to the calculated color.

(i) The real object color of the (x, y) pixel of the target object acquired in step S108

(ii) The CG color (iii) The target color of the (x, y) pixel of the virtual object determined in step S106

In step S116 in FIG. 4, the color adjusting unit 144 controls a variable for advancing the processing to the next pixel. Specifically, when the variable x is not a final pixel of the virtual object, the color adjusting unit 144 increments the variable x and shifts the processing to step S106. Consequently, the processing target shifts to a pixel on the right. When the variable x is the final pixel and the variable y is not the final pixel, the color adjusting unit 144 increments the variable y, sets the variable x to 1, and shifts the processing to step S106. Consequently, the processing target shifts to the immediately following pixel row. When the variable x and the variable y are the final pixel, the color adjusting unit 144 ends the processing and transmits additional image data including the virtual object after the adjustment of the CG color to the augmented-reality processing unit 142. Thereafter, the color adjusting unit 144 ends the processing.

As a result of the color adjustment processing shown in FIG. 4, as shown in FIGS. 5 and 6, the user UR visually recognizes a virtual image V1 including the virtual objects VO1 and VO2, the CG color of which is adjusted, in the visual field VR. The user UR visually recognizes the real object FO (the target object) in the outside scene SC transmitted through the image display unit 20. The virtual object V01 shown in FIG. 5 is displayed to be superimposed over the entire region of the vehicle body unit of the real object FO. Therefore, the user UR can view an image as if the color of the car has changed. A part of the virtual object VO2 shown in FIG. 6 is displayed to be superimposed in a lower part of the vehicle body in the real object FO. Therefore, the user UR can view an image as if a front spoiler is added to the car.

As explained above, in the color adjustment processing, the color adjusting unit 144 can control, using the real object color detected by the color detecting unit (the camera 61), a visual observation color, which is a color obtained by superimposing the color of the real object FO (the real object color) and the color of the virtual object VO (the CG color), in other words, a visual observation color, which is a color visually recognized by the user. As a result, the head-mounted display device (the HMD 100) in this embodiment can perform more appropriate color representation taking into account actual appearance for the user UR in the various scenes illustrated in FIGS. 5 and 6.

Further, in the color adjustment processing in step S110 and subsequent steps, the color adjusting unit 144 properly distinguishes, according to the chroma (brightness) of the real object color, whether the visual observation color is controlled by changing the transmittance of the outside scene SC or the visual observation color is controlled by adjusting the color of the virtual object VO. When the chroma of the real object color is high (the real object color is bright), it is effective to highlight the color of the virtual object VO by, for example, reducing the transmittance of the outside scene SC to make the bright real object color itself less easily seen for the user. On the other hand, when the chroma of the real object color is low (the real object color is dully), a representable color gamut can be expanded if a toned color obtained by adjusting the color of the virtual object VO with the additive color mixing. It is effective to improve the resolution of a color in this way because subtle color reproduction is possible. Consequently, the color adjusting unit 144 can properly use, according to the chroma of the real object color, a more appropriate method for controlling the visual observation color.

Further, in the color adjustment processing, the color adjusting unit 144 executes the control of the visual observation color for each pixel of the visual object VO. Therefore, it is possible to easily perform the control of the visual observation color. Even when a plurality of colors are mixed in the virtual object VO, it is possible to control the visual observation color. Note that the plurality of colors are mixed in the virtual object VO, besides when the virtual object VO has a plurality of original colors (e.g., a yacht having a blue body and a white sail), when an original color of a virtual object, a color for representing texture of the virtual object, a color for representing light irradiated on the virtual object, and a color for representing shading that occurs in the virtual object are mixed in the one virtual object VO (e.g., a front spoiler for a red car).

A-3. Variation of the Color Adjustment Processing

Note that, in the color adjustment processing (FIG. 4), variations 1 to 3 explained below may be applied to the color adjustment processing (FIG. 4). The variations 1 to 3 may be independently adopted or may be adopted in combination.

A-3-1. Variation 1

In the variation 1, the control of the visual observation color in accordance with the chroma of the real object color is omitted.

In an example, the color adjusting unit 144 controls the visual observation color by uniformly changing the transmittance of the external scene irrespective of the chroma of the real object color using the electronic shades. Specifically, steps S110 and S118 in FIG. 4 only have to be omitted. Consequently, it is possible to bring the visual observation color close to the target color by changing the transmittance of the outside scene SC in the image display unit 20. Therefore, it is possible to control the visual observation color without requiring special image processing in the head-mounted display device (the HMD 100).

In another example, the color adjusting unit 144 controls the visual observation color by uniformly adjusting the color of the virtual object irrespective of the chroma of the real object color. Specifically, steps S110, S112, and S114 in FIG. 4 only have to be omitted. Consequently, it is possible to bring the visual observation color close to the target color by adjusting the color (the CG color) of the virtual object VO. Therefore, it is possible to control the visual observation color without adding special components (the right electronic shade 261s and the left electronic shade 262s) to the existing components included in the head-mounted display device (the HMD 100).

A-3-2. Variation 2

In a variation 2, the control of the visual observation color is executed for each pixel block of the virtual object VO. The pixel block is a collection of n*m (n and m are integers equal to or larger than 2) pixels in the vicinity among pixels of the virtual object VO. The "pixels in the vicinity" means a plurality of pixels contiguous adjacent to one another.

In step S104 in FIG. 4, the color adjusting unit 144 sets 2 in the variables x and y used in the color adjustment processing. Both of the variables x and y are used to specify a pixel block configured from 3*3 pixels.

In the explanation of steps S106, S108, and S112, the description "(x, y) pixel" is replaced with "a pixel block centering on the (x, y) pixel". The description "color of the (x, y) pixel" is replaced with "a color of the pixel block centering on the (x, y) pixel". The color adjusting unit 144 can calculate the color of the pixel block according to statistical colors (e.g., average colors or median colors) of the pixels configuring the pixel block.

In the explanation of step S116, the description "increment" is replaced with "add 3 to an original value". The description "set the variable x to 1" is replaced with "set the variable x to 2".

Note that, in the example explained above, the pixel block configured from the 3*3 pixels using n=3 and m=3 is adopted. However, values of n and m can be optionally decided. The value of n may be set to a value different from the value of m.

According to the variation 2, since the color adjusting unit 144 executes the control of the visual observation color for each pixel block of the virtual object VO, it is possible to suppress a result of the control of the visual observation color from fluctuating for each pixel. Even when a plurality of colors are mixed in the virtual object VO, it is possible to control the visual observation color.

A-3-3. Variation 3

In a variation 3, alignment (calibration) of a display system is carried out.

In the HMD 100, the display system configured from an optical-image display unit (the left display driving unit 24 and the right optical-image display unit 26), the camera 61, and eyes of an average user is aligned. In the variation 3, content of this specified alignment can be changed according to an individual difference of the user of the HMD 100 and an individual difference of the HMD 100. Specifically, the CPU 140 executes procedures c1 and c2 explained below. From the viewpoint of improvement of accuracy of the alignment, it is desirable to execute the procedures c1 and c2 in combination and in the order of the procedure c1 and the procedure c2. However, the procedures c1 and c2 may be independently executed.

(c1) Adjustment of an Interocular Distance of the User

The CPU 140 causes the right LCD 241 and the left LCD 242 to display the same first images for calibration. In this embodiment, the display is infinity. At this point, the CPU 140 enables, through the operation of a user interface (e.g., the track pad 14), movement of the position of the first image for calibration displayed on one of the left and right LCDs. The user operates the user interface to align the positions of the left and right first images for calibration. Thereafter, the user operates a user interface (e.g., the determination key 11) to notify the CPU 140 that the positions are decided.

When being notified that the positions are decided, the CPU 140 transmits the position of the first image for calibration on the right LCD 241 and the position of the first image for calibration on the left LCD 242 to the image processing unit 160. The image processing unit 160 adjusts a display range of an image on the right LCD 241 with reference to the position of the first image for calibration on the right LCD 241. Similarly, the image processing unit 160 adjusts a display range of an image on the left LCD 242 with reference to the position of the first image for calibration on the left LCD 242.

(c2) Alignment of Images for Calibration and Real Objects by the User

The CPU 140 recognizes, while causing the right LCD 241 and the left LCD 242 to display second images for calibration, real objects (e.g., two-dimensional markers) corresponding to the second images for calibration via the camera 61. At this point, the CPU 140 tracks the poses and the positions of the real objects with respect to the camera 61 (or the optical display unit). The CPU 140 enables the positions of the second images for calibration displayed on the left and right LCDs to be moved by the operation of the user interface (e.g., the track pad 14) in association with each other. In this case, when the operation by the user is absent, the poses and the positions of the displayed second images for calibration may be changed according to the tracking of the real objects. Note that, when the procedure c1 is executed, display ranges of the second images for calibration are ranges after being adjusted by the procedure c1. When the procedure c1 is not executed, the display ranges of the second images for calibration are default ranges. The user operates the user interface (e.g., the determination key 11) at timing when the user perceives that the left and right images for calibration visually recognized as virtual images and the real objects visually recognized through the optical-image display units overlap (at least one of the positions, the sizes, and the directions substantially coincide with each other). The user notifies the CPU 140 that the positions are decided.

When being notified that the positions are decided, the CPU 140 acquires the positions of the real objects in an image (an outside scene image) obtained by image pickup of the camera 61, the position of the second image for calibration on the right LCD 241, and the position of the second image for calibration on the left LCD 242. The CPU 140 adjusts, on the basis of information concerning the acquired positions, an image pickup range of the camera 61 and display ranges of images on the right and left LCDs 241 and 242. Note that, in the procedure c2, the second images for calibration are movable on the LCDs 241 and 242. However, the second images for calibration may be displayed in fixed poses and in fixed positions. In the latter case, the user only has to move with respect to the real objects such that the user perceives that the second images for calibration and the real objects overlap.

According to the procedure c1 in the variation 3, the CPU 140 can perform alignment of the display system mainly corresponding to an individual difference of the user. According to the procedure c2 in the variation 3, the CPU 140 can perform alignment of the display system mainly corresponding to an individual difference of the HMD 100. As a result of the alignments, the CPU 140 can more accurately align the positions of the real objects and the positions of the virtual objects in the augmented reality processing. Note that the first images for calibration and the second images for calibration may be the same or may be different.

B. Second Embodiment

In a second embodiment of the invention, in color adjustment processing, a visual observation color is changed further taking into account a virtual light environment in addition to a real light environment. In the following explanation, only units having components and performing operations different from the components and the operations in the first embodiment are explained. Note that, in the figures, components and operations same as the components and the operations in the first embodiment are denoted by reference numerals and signs same as the reference numerals and signs in the first embodiment explained above and detailed explanation of the components and the operations is omitted. That is, components and operations not explained below are the same as the components and the operations in the first embodiment.

B-1. Configuration of a Head-Mounted Display Device

FIG. 7 is a block diagram showing the configuration of an HMD 100a in the second embodiment in terms of functions. The HMD 100a includes a control unit 10a instead of the control unit 10. The control unit 10a includes a color adjusting unit 144a instead of the color adjusting unit 144 and includes a storing unit 120a instead of the storing unit 120. In the color adjusting unit 144a, a part of processing content in the color adjustment processing is different from the processing content in the first embodiment.

The storing unit 120a further includes an environment correspondence table 124 and a preset group 126 in addition to the chroma reference 122. In the environment correspondence table 124, information for specifying one preset from a plurality of presets (the preset group 126) is stored. The preset group 126 is configured by the plurality of presets. Information for subjecting additional image data to color conversion is stored in the respective presets. The information for performing the color conversion includes, for example, information for white balance adjustment (specifically, at least a part of, for example, adjustment content of a tone curve of each of RGB, adjustment content of a color temperature, and adjustment content a color deviation).

B-2. Color Adjustment Processing

FIG. 8 is a diagram for explaining the color adjustment processing in the second embodiment. In the color adjustment processing in the first embodiment, a visual observation color is controlled (a broken line frame in FIG. 8) without taking into account a real light environment in which a target object is placed (step S106 in FIG. 4, b1: a catalog color) or taking into account the real light environment (step S106 in FIG. 4, b2: a matching color). In the second embodiment, it is possible to change the visual observation color further taking into account a virtual light environment in addition to such a real light environment. Note that the "real light environment" means a real light environment in which a target object of the color adjustment processing is placed. The "virtual light environment" means a virtual light environment to be visually recognized by a user of the HMD 100a.

When the virtual light environment is taken into account, in step S116 of the color adjustment processing shown in FIG. 4, the color adjusting unit 144a carries out color conversion processing explained below before transmitting additional image data to the augmented-reality processing unit 142 (a solid line frame in FIG. 8). On the other hand, when the virtual light environment is not taken into account, the color adjusting unit 144a directly carries out the color adjustment processing shown in FIG. 4 (a broken line frame in FIG. 8). As a result, the color adjusting unit 144a can carry out four patterns of processing shown in FIG. 8. Note that the color adjusting unit 144a can determine, for example, referring to content of setting stored in advance in the storing unit 120a, whether the virtual light environment is taken into account. The setting content may be changeable by the user.

B-2-1. Color Conversion Processing

FIG. 9 is a flowchart for explaining a procedure of the color conversion processing. The color conversion processing is processing for changing a visual observation color taking into account a virtual light environment by subjecting additional image data to color conversion. In step S200, the color adjusting unit 144a acquires a real light environment in which a target object is placed. The color adjusting unit 144a can acquire the real light environment, for example, using a method same as the reference b2-2 in step S106 of the color adjustment processing (FIG. 4).

In step S202, the color adjusting unit 144a acquires a virtual light environment. The virtual light environment can be determined, for example, with reference to the content of the setting stored in advance in the storing unit 120a. The setting content may be changeable by the user.

In step S204, the color adjusting unit 144a acquires, referring to the environment correspondence table 124, a preset that should be adopted.

FIG. 10 is a diagram showing an example of the environment correspondence table 124. In the environment correspondence table 124, in order to implement virtual light environments, identifiers of presents that should be adopted according to real light environments are stored in association with the virtual light environments and the real light environment. In the example shown in FIG. 10, the environment correspondence table 124 indicates that, for example, in order to implement the virtual light environment "fluorescent lamp", a preset is not adopted when a real light environment is "fluorescent lamp", a preset 3 is adopted when the real light environment is "incandescent lamp", and a preset 5 is adopted when the real light environment is "sunlight". The same applies to virtual light environments "incandescent lamp" and "sunlight". Therefore, explanation concerning the virtual light environments "incandescent lamp" and "sunlight" is omitted. In this embodiment, a daylight color is assumed as the fluorescent lamp and sunlight in a sunny day is assumed as the sunlight. Note that, in the example shown in FIG. 10, types of light sources are illustrated as examples of the light environments. However, as the light environments, for example, scene-like elements such as a morning glow and a sunset glow may be adopted.

In step S204 in FIG. 9, the color adjusting unit 144a searches through the environment correspondence table 124 using, as keys, the real light environment acquired in step S200 and the virtual light environment acquired in step S202 and acquires an identifier of a preset. The color adjusting unit 144a acquires the present having the acquired identifier from the preset group 126.

In step S206, the color adjusting unit 144a applies the preset acquired in step S204 to all pixels (which mean all pixels including black units) of the additional image data. As a result, adjustment of a tone curve for each of RGB, adjustment of a color temperature, adjustment of a color deviation, and the like stored in advance in the preset are applied to the entire additional image data. For example, when the preset 5 (a preset adopted when the real light environment is sunlight and the virtual light environment is fluorescent lamp) is adopted, for example, adjustment for setting the color temperature to 4000 K and raising a tone curve of B is applied to the entire additional image data. By subjecting the entire additional image data including the virtual object to the color conversion in this way, the color adjusting unit 144a can change the visual observation color taking into account the virtual light environment. As a result, in the head-mounted display device (the HMD 100a) in this embodiment, latitude of reproduction of the visual observation color is increased. It is possible to improve convenience for the user.

Note that, in the color conversion processing explained above, the control of the visual observation color taking into account the virtual light environment is implemented by the color conversion of the additional image data. However, the color adjusting unit 144a may implement the change of the visual observation color taking into account the virtual light environment by using the electronic shades instead of the color conversion of the additional image data or in addition to the color conversion of the additional image data. In this case, control content (e.g., adjustment content of a supply voltage to the electronic shades) may be stored in, for example, the preset.

B-3. Variation of the Color Adjustment Processing

In the color adjustment processing in the second embodiment, the variations 1 to 3 may be adopted. The variations 1 to 3 may be independently adopted or may be adopted in combination.

C. Modifications

In the embodiments, a part of the components implemented by hardware may be replaced with software. Conversely, a part of the components implemented by software may be replaced with hardware. Besides, modifications explained below are also possible.

Modification 1

In the embodiments, the configurations of the HMDs are illustrated. However, the configurations of the HMDs can be optionally set without departing from the spirit of the invention. For example, addition, deletion, conversion, and the like of the components can be performed.

The allocation of the components to the control unit and the image display unit is only an example. Various forms of the allocation can be adopted. For example, forms explained below may be adopted.

(i) A form in which processing functions such as a CPU and a memory are mounted on the control unit and only a display function is mounted on the image display unit (ii) a form in which the processing functions such as the CPU and the memory are mounted on both of the control unit and the image display unit (iii) a form in which the control unit and the image display unit are integrated (e.g., a form in which the control unit is included in the image display unit and functions as an eyeglass-type wearable computer)

(iv) a form in which a smart phone or a portable game machine is used instead of the control unit (v) a form in which the control unit and the image display unit are connected via a wireless signal transmission line such as a wireless LAN, infrared communication, or a Bluetooth and a connecting unit (a cord) is removed. Note that, in this case, power supply to the control unit or the image display unit may be carried out wirelessly.

For example, the configurations of the control unit and the image display unit illustrated in the embodiment can be optionally changed. Specifically, for example, both of the transmitting units (Tx) of the control unit and the receiving units (Rx) of the image display unit may include a function capable of performing bidirectional communication and may function as a transmitting and receiving unit. For example, a part of the interface for operation (the keys, the track pad, etc.) included in the control unit may be omitted. Another interface for operation such as a stick for operation may be included in the control unit. For example, devices such as a keyboard and a mouse may be connectable to the control unit such that the control unit receives inputs from the keyboard and the mouse. For example, the secondary cell is used as the power supply. However, the power supply is not limited to the secondary cell. Various cells can be used. For example, a primary cell, a fuel cell, a solar cell, or a thermal cell may be used.

FIGS. 11A and 11B are explanatory diagrams showing the configurations of the exteriors of HMDs in modifications. An image display unit 20x shown in FIG. 11A includes a right optical-image display unit 26x and a left optical-image display unit 28x. The right optical-image display unit 26x and the left optical-image display unit 28x are formed smaller than the optical members in the embodiment and are respectively arranged obliquely above the right eye and the left eye of the user when the user wears the HMD. An image display unit 20y shown in FIG. 11B includes a right optical-image display unit 26y and a left optical-image display unit 28y. The right optical-image display unit 26y and the left optical-image display unit 28y are formed smaller than the optical members in the embodiment and are respectively arranged obliquely below the right eye and the left eye of the user when the user wears the HMD. In this way, the optical-image display units only have to be arranged in the vicinities of the eyes of the user. The size of optical members forming the optical-image display units may be any size. The optical-image display units may have a form in which the optical-image display units cover only a unit of the eyes of the user, in other words, a form in which the optical-image display unit do not completely cover the eyes of the user.

For example, the processing units (e.g., the image processing unit, the display control unit, the augmented-reality processing unit) included in the control unit may be configured using an ASIC (Application Specific Integrated Circuit) designed for implementing the functions.

For example, the HMD is the transmissive HMD of a binocular type. However, the HMD may be a HMD of a monocular type. For example, the HMD may be configured as a nontransmissive HMD that blocks transmission of an outside scene in a state in which the user wears the HMD or may be configured as a video see-through device in which a camera is mounted on the nontransmissive HMD. For example, as the earphones, an ear hook type or a headband type may be adopted. The earphones may be omitted.

For example, instead of the image display unit worn like the eyeglasses, a normal flat display device (a liquid crystal display device, a plasma display device, an organic EL display device, or the like) may be adopted. In this case, the control unit and the image display unit may be connected by wire or by radio. Consequently, the control unit can also be used as a remote controller of the normal flat display device.

For example, instead of the image display unit worn like the eyeglasses, image display units of other forms such as an image display unit worn like a hat and an image display unit incorporated in a body protector such as a helmet may be adopted. For example, the image display unit may be configured as a head-up display (HUD) mounted on vehicles such as an automobile and an airplane or other transportation means.

For example, the image-light generating unit may include components for implementing another system in addition to the components (the backlights, the backlight control units, the LCDs, and the LCD control units) or instead of the components. For example, the image-light generating unit may include an organic EL (organic Electro-Luminescence) display and an organic EL control unit. For example, the image generating unit may include a digital micro mirror device or the like instead of the LCD. For example, the invention can also be applied to a head-mounted display device of a laser retinal projection type.

Modification 2

In the embodiment, the examples of the augmented reality processing and the color adjustment processing are explained. However, the procedures of these kinds of processing explained in the embodiment are only examples. Various modifications of the procedures are possible. For example, a part of the steps may be omitted or still other steps may be added. The order of steps to be executed may be changed.

For example, the color adjustment processing (FIG. 4) may be executed between the procedure a4 and the procedure a5 of the augmented reality processing. For example, the color adjusting unit may carry out the color adjustment processing only for at least one of hue, chroma, and brightness among constituent elements of "color".

For example, in step S106 of the color adjustment processing, the color adjusting unit determines the target color for each pixel (or each pixel block). However, the color adjusting unit may determine the target color in virtual object units. When the target color is determined in virtual object units, the virtual object has a single color. In this case, after step S116 ends, the color adjusting unit only has to shift the processing to step S108.

For example, in step S108 of the color adjustment processing, when the HMD includes other color detecting means such as a color sensor, the color adjusting unit may acquire the real object color using the other color detecting means.

For example, the determination in step S110 of the color adjustment processing may be carried out only once for the first pixel (or the first pixel block). Thereafter, the determination may be omitted because the same processing is repeated. Consequently, it is possible to reduce a processing amount in the color adjusting unit.

For example, in the determination in step S110 of the color adjustment processing, a different plurality of chroma references (a first chroma reference and a second chroma reference; a relation of the first chroma reference>the second chroma reference is satisfied) may be concurrently used. For example, the color adjusting unit may execute the processing in step S112 and subsequent steps when the chroma of the real object color is equal to or higher than the first chroma reference, execute the processing in step S118 and subsequent steps when the chroma of the real object color is equal to or lower than the second chroma reference, and concurrently use the processing in step S112 and subsequent steps and the processing in step S118 and subsequent steps when the chroma of the real object color is lower than the first chroma reference and higher than the second chroma reference. Consequently, the color adjusting unit can carry out finer control of the visual observation color.

For example, in step S112 of the color adjustment processing, the color adjusting unit may acquire an ultraviolet ray, an infrared ray, and the like near the real object and determine the transmittance of the electronic shades according to states of the acquired ultraviolet ray and infrared ray.

For example, in step S118 of the color adjustment processing, the color adjusting unit may concurrently use the electronic shades in addition to adjusting the CG color of the virtual object on the basis of any one of the chroma of the real object color and the ultraviolet ray and the infrared ray near the real object.

For example, the real object and the virtual object illustrated in the embodiments can be optionally changed. For example, a "real background object" may be used as the real object. The real object may be planar (e.g., a wall or a screen). The virtual object may also be planar (e.g., an image of an advertisement seen as if affixed to the wall provided as the real object).

For example, the virtual image formed in front of the eyes of the user in the augmented reality processing may include only the virtual object or may include information (e.g., a menu bar and a clock) other than the virtual object.

Modification 3

The invention is not limited to the embodiments, the examples, and the modifications explained above and can be implemented as various configurations without departing from the spirit of the invention. For example, the technical features in the embodiments, the examples, and the modifications corresponding to the technical features in the aspects described in the summary can be replaced or combined as appropriate in order to solve a part or all of the problems or attain a part or all of the effects. Unless the technical features are explained in this specification as essential technical features, the technical features can be deleted as appropriate.

REFERENCE SIGNS LIST 10, 10a Control units
11 Determination key
12 Lighting unit
13 Display switching key
14 Track pad
15 Luminance switching key
16 Direction key
17 Menu key
18 Power switch
20 Image display unit
21 Right holding unit
22 Right display driving unit
23 Left holding unit
24 Left display driving unit
26 Right optical-image display unit
28 Left optical-image display unit
30 Earphone plug
32 Right earphone
34 Left earphone
40 Connecting unit
42 Right cord
44 Left cord
46 Coupling member
48 Main body cord
51 Transmitting unit
52 Transmitting unit
53 Receiving unit
54 Receiving unit
61 Camera (Color detecting unit)
66 Nine-axis sensor
110 Input-information acquiring unit
100 HMD (Head-mounted display device)
120, 120a Storing units
122 Chroma reference
124 Environment correspondence table
126 Preset group
130 Power supply
132 Radio communication unit
140 CPU
142 Augmented-reality processing unit
144, 144a Color adjusting units
160 Image processing unit
170 Sound processing unit
180 Interface
190 Display control unit
201 Right backlight control unit
202 Left backlight control unit
211 Right LCD control unit
212 Left LCD control unit
221 Right backlight
222 Left backlight
241 Right LCD
242 Left LCD
251 Right projection optical system
252 Left projection optical system
261 Right light guide plate
262 Left light guide plate
261s Right electronic shade
262s Left electronic shade
PCLK Clock signal
VSync Vertical synchronization signal
HSync Horizontal synchronization signal
Data Image data
Data1 Additional image data
Data2 Additional image data
OA External apparatus
PC Personal computer
SC Outside scene
VI Virtual image
VR Visual field
RE Right eye
LE Left eye
ER End
EL End
VO Virtual object
VO1 Virtual object
VO2 Virtual object
FO Target object (Real object)

The invention claimed is:

1. A head-mounted display device with which a user can visually recognize a virtual image and an outside scene, the head-mounted display device comprising:
an image display unit configured to cause the user to visually recognize the virtual image;
an augmented-reality processing unit configured to cause the image display unit to form the virtual image including a virtual object, at least a part of which is superimposed and displayed on a real object present in a real world;

a color detecting unit configured to detect a real object color, which is a color of the real object; and a color adjusting unit configured to bring a visual observation color, which is a color obtained by superimposing a color of the virtual object on the real object color, close to a target color using the detected real object color, wherein the color adjusting unit brings the visual observation color close to the target color by adjusting the color of the virtual object to bring a color obtained by additive color mixing of the detected real object color and the color of the virtual object close to the target color, when chroma of the detected real object color is greater than or equal to predetermined chroma, the color adjusting unit causes the image display unit to change the transmittance of the outside scene, and when the chroma of the detected real object color is less than the predetermined chroma, the color adjusting unit adjusts the color of the virtual object to bring the color obtained by the additive color mixing of the detected real object color and the color of the virtual object close to the target color.

2. The head-mounted display device according to claim 1, wherein the image display unit is further capable of changing transmittance of the outside scene for each pixel, and the color adjusting unit brings the visual observation color close to the target color by causing the image display unit to change the transmittance of the outside scene.

3. The head-mounted display device according to claim 1, wherein the color adjusting unit executes, for each pixel of the virtual object, processing for bringing the visual observation color close to the target color.

4. The head-mounted display device according to claim 1, wherein the color adjusting unit executes, for each n*m (n and m are integers equal to or larger than 2) pixel block, which is a collection of a plurality of pixels in a vicinity among pixels of the virtual object, processing for bringing the visual observation color close to the target color.

5. The head-mounted display device according to claim 1, wherein the color adjusting unit determines the target color on the basis of a real light environment in which the real object is placed.

6. The head-mounted display device according to claim 1, wherein the color adjusting unit further changes the visual observation color by converting the color of the virtual object taking into account a virtual light environment.

7. The head-mounted display device according to claim 1, wherein the color detecting unit is a camera that acquires an outside scene image representing the outside scene.

8. A method of controlling a head-mounted display device with which a user can visually recognize a virtual image and an outside scene, the method comprising:

causing the head-mounted display device to form a virtual image including a virtual object, at least a part of which is superimposed and displayed on a real object present in a real world;

detecting a real object color, which is a color of the real object; and bringing a visual observation color, which is a color obtained by superimposing a color of the virtual object on the real object color, close to a target color using the detected real object color;

bringing the visual observation color close to the target color by adjusting the color of the virtual object to bring a color obtained by additive color mixing of the detected real object color and the color of the virtual object close to the target color;

when chroma of the detected real object color is greater than or equal to predetermined chroma, causing the head-mounted display device to change the transmittance of the outside scene; and when the chroma of the detected real object color is less than the predetermined chroma, adjusting the color of the virtual object to bring the color obtained by the additive color mixing of the detected real object color and the color of the virtual object close to the target color.

9. A non-transitory computer-readable medium having a program stored thereon, the program for controlling a head-mounted display device with which a user can visually recognize a virtual image and an outside scene, and the program causing a computer to execute:

a function of causing the head-mounted display device to form a virtual image including a virtual object, at least a part of which is superimposed and displayed on a real object present in a real world;

a function of detecting a real object color, which is a color of the real object;

a function of bringing a visual observation color, which is a color obtained by superimposing a color of the virtual object on the real object color, close to a target color using the detected real object color;

a function of bringing the visual observation color close to the target color by adjusting the color of the virtual object to bring a color obtained by additive color mixing of the detected real object color and the color of the virtual object close to the target color;

when chroma of the detected real object color is greater than or equal to predetermined chroma, a function of causing the head-mounted display device to change the transmittance of the outside scene; and when the chroma of the detected real object color is less than the predetermined chroma, a function of adjusting the color of the virtual object to bring the color obtained by the additive color mixing of the detected real object color and the color of the virtual object close to the target color.

* * * * *